United States Patent
Hanson (10) Patent No.: US 11,582,047 B2
(45) Date of Patent: Feb. 14, 2023

(54) ISOLATION IN POWER-OVER-ETHERNET POWERED DEVICES

(71) Applicant: CommScope Technologies LLC, Hickory, NC (US)

(72) Inventor: Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 611 days.

(21) Appl. No.: 15/569,370

(22) PCT Filed: Apr. 28, 2016

(86) PCT No.: PCT/US2016/029836
§ 371 (c)(1),
(2) Date: Oct. 25, 2017

(87) PCT Pub. No.: WO2016/176481
PCT Pub. Date: Nov. 3, 2016

(65) Prior Publication Data
US 2018/0302230 A1 Oct. 18, 2018

Related U.S. Application Data

(60) Provisional application No. 62/153,809, filed on Apr. 28, 2015.

(51) Int. Cl.
*H04L 12/10* (2006.01)
*G06F 1/26* (2006.01)
(Continued)

(52) U.S. Cl.
CPC .............. *H04L 12/10* (2013.01); *G06F 1/266* (2013.01); *H04L 12/40045* (2013.01);
(Continued)

(58) Field of Classification Search
CPC ... H04L 12/10; H04L 12/40045; G06F 1/266; G06F 1/263; H02J 1/10; H04W 88/085
See application file for complete search history.

(56) References Cited

U.S. PATENT DOCUMENTS

| 5,834,925 A | 11/1998 | Chesavage |
| 7,187,268 B1 * | 3/2007 | Armstrong .............. H04L 12/10 340/12.32 |

(Continued)

FOREIGN PATENT DOCUMENTS

| CN | 101911586 A | 12/2010 |
| CN | 204168306 U | 2/2015 |

OTHER PUBLICATIONS

European Patent Office, "Extended European Search Report from EP Application No. 16787171.4 dated Aug. 10, 2018" From Foreign Counterpart of U.S. Appl. No. 15/569,370; pp. 1-8; Published in EP.

(Continued)

*Primary Examiner* — Jaweed A Abbaszadeh
*Assistant Examiner* — Gayathri Sampath
(74) *Attorney, Agent, or Firm* — Fogg & Powers LLC (57) ABSTRACT

One embodiment is directed a powered device that comprises a connector to connect a multi-conductor cable to the powered device and device circuits partitioned into a first partition and a second partition. The powered device is configured to receive power from a first cable circuit and a second cable circuit provided over the multi-conductor cable. The powered device is configured to separately power the first partition using power received from the first cable circuit and power the second partition using power received from the second cable circuit and to power isolate the first cable circuit from the second cable circuit. The powered device further comprises at least one isolation device coupled to the first partition and the second partition and (Continued)

configured to enable information to be communicated between the first partition and the second partition. Other embodiments are disclosed.

33 Claims, 6 Drawing Sheets

(51) Int. Cl.
    *H04L 12/40*     (2006.01)
    *H02J 1/10*      (2006.01)
    *H04W 88/08*     (2009.01)
    *H04B 3/54*      (2006.01)

(52) U.S. Cl.
    CPC ............ *G06F 1/263* (2013.01); *H02J 1/10* (2013.01); *H04W 88/085* (2013.01)

(56) References Cited

U.S. PATENT DOCUMENTS

| | | | |
|---|---|---|---|
| 7,404,091 B1 * | 7/2008 | Gere | H04L 12/10 713/300 |
| 7,770,035 B1 * | 8/2010 | John | G06F 1/3203 713/300 |
| 2005/0044431 A1 * | 2/2005 | Lang | G06F 1/266 713/300 |
| 2005/0197094 A1 | 9/2005 | Darshan et al. | |
| 2007/0260904 A1 * | 11/2007 | Camagna | H04L 12/10 713/310 |
| 2008/0054720 A1 | 3/2008 | Lum et al. | |
| 2008/0181316 A1 * | 7/2008 | Crawley | H02M 3/33507 375/258 |
| 2008/0238656 A1 | 10/2008 | de la Torre Vega et al. | |
| 2008/0294918 A1 | 11/2008 | Dhuyvetter et al. | |
| 2009/0168462 A1 | 7/2009 | Schopfer et al. | |
| 2009/0172421 A1 | 7/2009 | Schindler | |
| 2009/0327558 A1 | 12/2009 | Landry et al. | |
| 2011/0241425 A1 * | 10/2011 | Hunter, Jr. | H04L 12/40045 307/39 |
| 2012/0137144 A1 | 5/2012 | Schindler | |
| 2013/0117581 A1 * | 5/2013 | Katkade | H04L 12/10 713/300 |
| 2013/0201316 A1 | 8/2013 | Binder et al. | |
| 2014/0101477 A1 * | 4/2014 | Patterson | G06F 13/4256 713/340 |
| 2016/0282894 A1 * | 9/2016 | Hazani | H02J 4/00 |

OTHER PUBLICATIONS

International Searching Authority, "Search Report and Written Opinion for PCT Application Serial No. PCT/US2016/029836", dated Aug. 1, 2016, pp. 1-16, Published in: WO.

China National Intellectual Property Administration, "First Office Action from CN Application No. 201680021617.9", from Foreign Counterpart to U.S. Appl. No. 15/569,370, dated Mar. 16, 2020, pp. 1-34, Published: CN.

China National Intellectual Property Administration, "Second Office Action from CN Application No. 201680021617.9", from Foreign Counterpart to U.S. Appl. No. 15/569,370, dated Sep. 9, 2020, pp. 1 through 29, Published: CN.

China National Intellectual Property Administration, "Rejection Decision from CN Application No. 201680021617.9", from Foreign Counterpart to U.S. Appl. No. 15/569,370, dated Dec. 10, 2020, pp. 1 through 18, Published: CN.

China National Intellectual Property Administration, "Notification of Reexamination from CN Application No. 201680021617.9", from Foreign Counterpart to U.S. Appl. No. 15/569,370, dated Sep. 29, 2021, pp. 1 through 22, Published: CN.

* cited by examiner

ISOLATION IN POWER-OVER-ETHERNET POWERED DEVICES

CROSS-REFERENCE TO RELATED APPLICATIONS

This application is a U.S. National Stage application of PCT Application Serial No. PCT/US2016/029836, filed 28 Apr. 2016 and titled "ISOLATION IN POWER-OVER-ETHERNET POWERED DEVICES," which claims the benefit of U.S. Provisional Application Ser. No. 62/153,809, filed 28 Apr. 2015 and titled "ISOLATION IN POWER-OVER-ETHERNET POWERED DEVICES," the contents of all of which are incorporated herein by reference.

BACKGROUND

The present disclosure relates to the use of multiple limited-power circuits for Power over Ethernet powered devices, and more particularly, the use of one or more isolation devices to communicate information between multiple paths in powered devices.

Power over Ethernet ("POE") allows network cables to carry electrical power. Use of POE systems may eliminate the need to run separate power to devices by a single network cable (e.g., an Ethernet cable) to carry both power and data to the devices. POE is intended to comply with certain requirements and safety rules for lower power and voltage circuits to allow for installation of POE systems by a non-electrician. Specifically, POE may have requirements similar to those for limited power source ("LPS") and safety extra low voltage ("SELV") circuits (e.g., LPS and SELV circuits may be limited to less than 60 VDC and less than 100 W).

In some instances, a powered device may require power above the limits set for LPS systems (e.g., more than 100 W). In many POE systems, two pairs within a four-pair Category 5 or higher cable may form an LPS circuit to provide power to a powered device. A four-pair Category 5 or higher cable is also referred to here as a "CAT cable." One pair may function as the voltage source, V+, and the other pair may function as the voltage return, V−. The LPS circuit formed by the two-pair POE circuit may be capable of providing up to 100 W of power. The other two pairs in the four-pair CAT cable may remain unused. If the two unused pair were to be utilized, another 100 W may be provided to the powered device. It may be permitted to have more than one LPS circuit in a multi-conductor cable. But, the power from more than one LPS may not be combined in the powered devices pursuant to certain requirements and safety rules. Each LPS circuit in the multi-conductor cable should remain separate and isolated.

SUMMARY

One embodiment is directed to a powered device configured for receiving power from a multi-conductor cable and communicating information over the multi-conductor cable. The powered device comprises a connector to connect the multi-conductor cable to the powered device and device circuits partitioned into a first partition and a second partition. The powered device is configured to receive power from a first cable circuit and a second cable circuit provided over the multi-conductor cable. The powered device is configured to separately power the first partition using power received from the first cable circuit and power the second partition using power received from the second cable circuit and to power isolate the first cable circuit from the second cable circuit. The powered device further comprises at least one isolation device coupled to the first partition and the second partition and configured to enable information to be communicated between the first partition and the second partition.

Another embodiment is directed to a method of providing power and communicating information to a powered device over a multi-conductor cable. The powered device comprises device circuits partitioned into a first partition and a second partition. The method comprises receiving power from a first cable circuit provided over the multi-conductor cable to separately power the first partition and receiving power from a second cable circuit provided over the multi-conductor cable to separately power the second partition. The method further comprises powering isolating the first cable circuit from the second cable circuit, and communicating information between the first partition and the second partition using at least one isolation device in the powered device that is coupled to the first partition and the second partition.

Another embodiment is directed to a powered device configured for receiving power from first and second multi-conductor cables and communicating information over at least one of the first and second multi-conductor cables. The powered device comprises first and second connectors to connect the first and second multi-conductor cables to the powered device and device circuits partitioned into a first partition, a second partition, a third partition, and a fourth partition. The powered device is configured to receive power from a first cable circuit and a second cable circuit provided over the first multi-conductor cable. The powered device is configured to separately power the first partition using power received from the first cable circuit and power the second partition using power received from the second cable circuit and to power isolate the first cable circuit from the second cable circuit. The powered device is configured to receive power from a third cable circuit and a fourth cable circuit provided over the second multi-conductor cable. The powered device is configured to separately power the third partition using power received from the third cable circuit and power the fourth partition using power received from the fourth cable circuit and to power isolate the third cable circuit from the fourth cable circuit. The powered device further comprises at least one isolation device coupled to at least two of the first partition, the second partition, the third partition, and fourth partition and configured to enable information to be communicated between at least two of the first partition, the second partition, the third partition, and fourth partition.

Another embodiment is directed to a method of providing power to a powered device over first and second multi-conductor cables. The powered device is configured to communicate information over at least one of the first and second multi-conductor cables. The powered device comprises device circuits partitioned into a first partition, a second partition, a third partition, and a fourth partition. The method comprises receiving power from a first cable circuit provided over the first multi-conductor cable to separately power the first partition, receiving power from a second cable circuit provided over the first multi-conductor cable to separately power the second partition, receiving power from a third cable circuit provided over the second multi-conductor cable to separately power the third partition, and receiving power from a fourth cable circuit provided over the second multi-conductor cable to separately power the fourth partition. The method further comprises powering isolating the first cable circuit from the second cable circuit and powering isolating the third cable circuit from the fourth cable circuit. The method further comprises communicating information between at least two of the first partition, the second partition, the third partition, and fourth partition using at least one isolation device coupled to at least two of the first partition, the second partition, the third partition, and fourth partition.

Another embodiment is directed to a powered device assembly comprising a first powered device configured to receive power from a first multi-conductor cable and a second device configured to receive power from a second multi-conductor cable. At least one of the first powered device and the second powered device is configured to communicate information over at least one of the first and second multi-conductor cables. The first powered device comprises a first connector to connect the first multi-conductor cable to the first powered device and first device circuits partitioned into a first partition and a second partition. The first powered device is configured to receive power from a first cable circuit and a second cable circuit provided over the first multi-conductor cable. The first powered device configured to separately power the first partition using power received from the first cable circuit and power the second partition using power received from the second cable circuit and to power isolate the first cable circuit from the second cable circuit. The second powered device comprises a second connector to connect the second multi-conductor cable to the second powered device and second device circuits partitioned into a third partition and a fourth partition. The second powered device is configured to receive power from a third cable circuit and a fourth cable circuit provided over the second multi-conductor cable, the second powered device configured to separately power the third partition using power received from the third cable circuit and power the fourth partition using power received from the fourth cable circuit and to power isolate the third cable circuit from the fourth cable circuit. The powered device assembly further comprises at least one isolation device coupled to at least two of the first partition, the second partition, the third partition, and fourth partition and configured to enable information to be communicated between at least two of the first partition, the second partition, the third partition, and fourth partition.

Another embodiment is directed to a method of providing power to a powered device assembly over first and second multi-conductor cables. The powered device assembly comprises first and second powered devices. At least one of the first powered device and the second powered device is configured to communicate information over at least one of the first and second multi-conductor cables. The first powered device comprises first device circuits partitioned into a first partition and a second partition. The second powered device comprising second device circuits comprising a third partition and a fourth partition. The method comprises receiving power from a first cable circuit provided over the first multi-conductor cable to separately power the first partition, receiving power from a second cable circuit provided over the first multi-conductor cable to separately power the second partition, receiving power from a third cable circuit provided over the second multi-conductor cable to separately power the third partition, and receiving power from a fourth cable circuit provided over the second multi-conductor cable to separately power the fourth partition. The method further comprises powering isolating the first cable circuit from the second cable circuit and powering isolating the third cable circuit from the fourth cable circuit. The method further comprises communicating information between at least two of the first partition, the second partition, the third partition, and fourth partition using at least one isolation device coupled to the at least two of the first partition, the second partition, the third partition, and fourth partition.

DETAILED DESCRIPTION

In one aspect, separate circuits may be maintained in a single powered device, with each circuit under the 100 Watt (W) LPS limit, but together make more than 100 W available to the powered device as a whole using one four-pair Ethernet cable. The circuits may be partitioned in such a manner such that each partition consumes less than 100 W. High-isolation interface circuits may be used to provide sufficient electrical isolation such that each partition and its powering LPS circuit may be considered as a separate circuit in light of the relevant requirements and safety rules.

Figure 1:
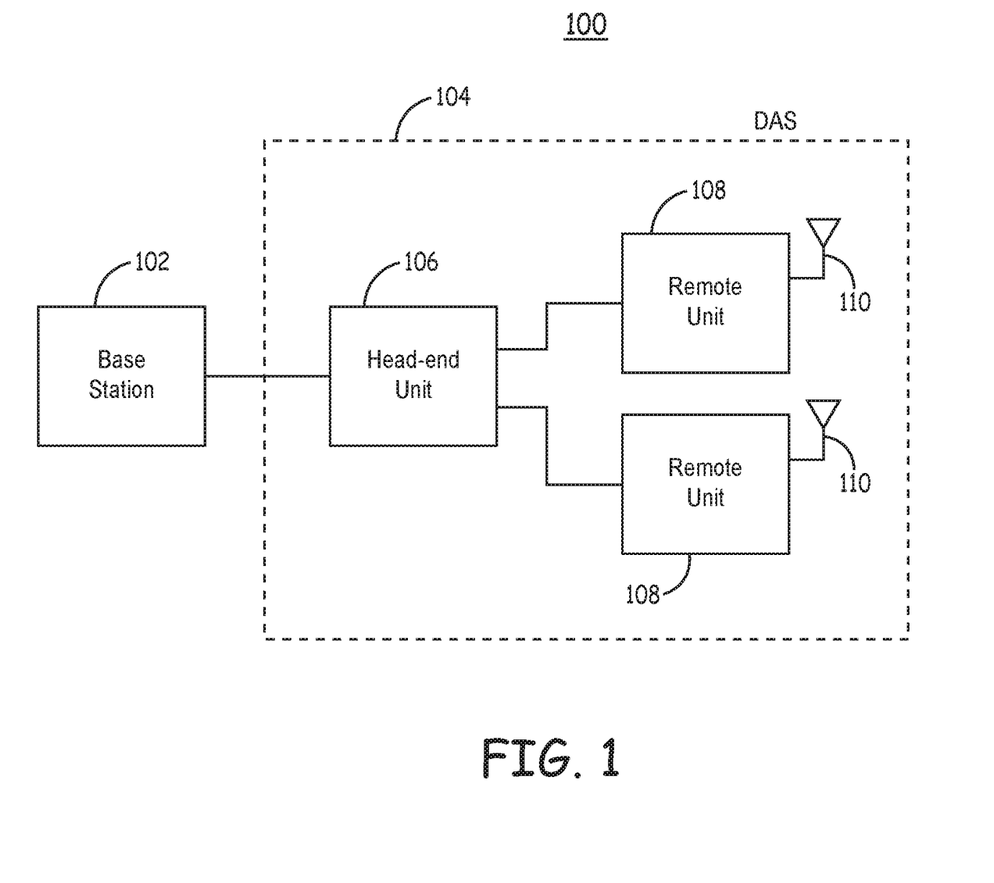
FIG. 1 shows an example of a telecommunications system environment that may be used for implanting the techniques described herein.

FIG. 1 shows an example of a telecommunications system 100 that may be used for implementation of the techniques described here.

The telecommunications system 100 may include a base station 102 communicatively coupled to a DAS 104 via a head-end unit 106 in the DAS 104. The DAS 104 includes the head-end unit 106 and multiple remote units 108 communicatively coupled to the head-end unit 106. Each remote unit 108 includes or is coupled to at least one antenna 110. For illustrative purposes, one head-end unit 106 and two remote units 108 are depicted in FIG. 1. However, any number of head-end units 106 and remote units 108 may be included in a DAS 104.

The head-end unit 106 may include a master unit or other suitable unit that may communicate with one or more base stations or other transceiver devices in communication with the DAS 104. The head-end unit 106 may include, for example, an optical transceiver that transmits optical signals to the remote units 108. The head-end unit 106 or other suitable unit may communicate with remote units 108 in different coverage zones of the same DAS 104.

The DAS 104 may communicate signals to and from mobile stations or other terminal devices via the head-end unit 106 and the remote units 108 that service one or more coverage zones. The head-end unit 106 may be communicatively coupled with the base station 102 and the remote units 108 in any suitable manner. Communicatively coupling devices in a DAS 104 or other telecommunication system may involve establishing, maintaining, or otherwise using a communication link (e.g., a cable, an optical fiber, a wireless link, etc.) to communicate information between the devices. Any suitable types of communication lines may be used in the DAS 104. A suitable communication link may be a wired connection or a wireless connection. Types of wired connections may include, for example, a connection via a copper cable, an optical fiber, or another suitable communication medium. Types of wireless connections may include, for example, a wireless radio frequency ("RF") communication link or a microwave link. The type of communication link between the base station 102 and the head-end unit 106 may be the same as or different from the type of communication link between the head-end unit 106 and the remote units 108. Although FIG. 1 depicts direct links between the head-end unit 106 and the remote units 108, other implementations are possible. In some aspects, the head-end unit 106 may be communicatively coupled to the remote units 108 via one or more extension units or other intermediate devices (not shown).

Radio frequency signals transmitted from the base station 102 are received at the head-end unit 106. The head-end unit 106 uses the downlink RF signals to generate a downlink transport signal that is distributed to one or more of the remote units 108. Each such remote unit 108 receives the downlink transport signal and reconstructs a version of the downlink RF signals based on the downlink transport signal and causes the reconstructed downlink RF signals to be radiated from at least one antenna 110 coupled to or included in that remote unit 108. A similar process is performed in the uplink direction. RF signals transmitted from mobile stations are received at each remote unit 108. Each remote unit 108 uses the uplink RF signals to generate an uplink transport signal that is transmitted from the remote unit 108 to the head-end unit 106. The head-end unit 106 receives and combines the uplink transport signals transmitted from the remote units 108. The head-end unit 106 reconstructs a combined version of the uplink RF signals received at the various remote units 108 and communicates the reconstructed uplink RF signals to the base station 102. In this way, the coverage of the base station 102 can be expanded using the DAS 104.

The DAS 104 can use either digital transport, analog transport, or combinations of digital and analog transport for communicating between the head-end unit 106 and the remote units 108. The examples described below are described, for the purposes of illustration, as being implemented using digital transport. However, it is to be understood that such examples can also be implemented in DASs that use analog transport or combinations of analog and digital transport.

In embodiments where the DAS 104 uses digital transport for communicating between the head-end unit 106 and the remote units 108, digital samples indicative of the original wireless signals are communicated between the head-end unit 106 and the remote units 108. In such embodiments, the digital samples can be in the form of digital in-phase (I) and quadrature (Q) samples (though it is to be understood that other embodiments can use other forms of digital samples). Digital IQ samples can be produced from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase and quadrature samples. These digital IQ samples can also be filtered, amplified, attenuated, and/or re-sampled or decimated to a lower sample rate. The digital samples can be produced in other ways. The portion of wireless spectrum can include, for example, a band of wireless spectrum, a sub-band of a given band of wireless spectrum, or an individual wireless carrier. Likewise, an analog wireless signal can be produced from digital IQ samples by digitally up-converting the digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal).

In some aspects, one or more of the remote units 108 of the DAS 104 may be implemented as a powered device implementing the techniques described below. For example, where the DAS 104 is implemented as a "digital" DAS 104, each remote unit 108 may include hardware/logic circuits (e.g., field-programmable gate arrays, PHY circuits, processors), RF circuits (transmitters, receivers, synthesizers), and/or data conversion circuits (analog-to-digital converters ("ADCs"), digital-to-analog converters ("DACs")). For example, the remote unit 108 may be partitioned such that the hardware/logic circuits and the data conversion circuits are in one partition, and the RF circuits are in a second partition. In such an example, it may be necessary for electrical signals to cross from one partition to the second partition. This may be accomplished by sending the electrical signals through an isolation device (e.g., transformer, opto-isolator). In another example, the data conversion circuits may be included in a partition with the RF circuits and the hardware/logic circuits may be in a separate partition. There, the digitized ADC and DAC signals may be passed through the isolation device.

The techniques described below can be used in other applications. For example, the techniques described below can be used with one or more nodes of an analog DAS, a hybrid digital/analog DAS, or a cloud or centralized radio access network (C-RAN) or with a base station or eNodeB in a radio access network (for example, a small cell or femto-cell) or a wireless local area network access point (WLAN AP) (for example, a WLAN AP deployed in a conventional data network and/or a WLAN AP used in or with a radio access network, such as a WLAN AP deployed in an LTE in Unlicensed Spectrum (LTE-U) deployment, in an LTE License Assisted Access (LAA) deployment, and/or in an LTE-WLAN Radio Level Aggregation (LWA) deployment). The techniques described below can be used in other applications.

Figure 2:
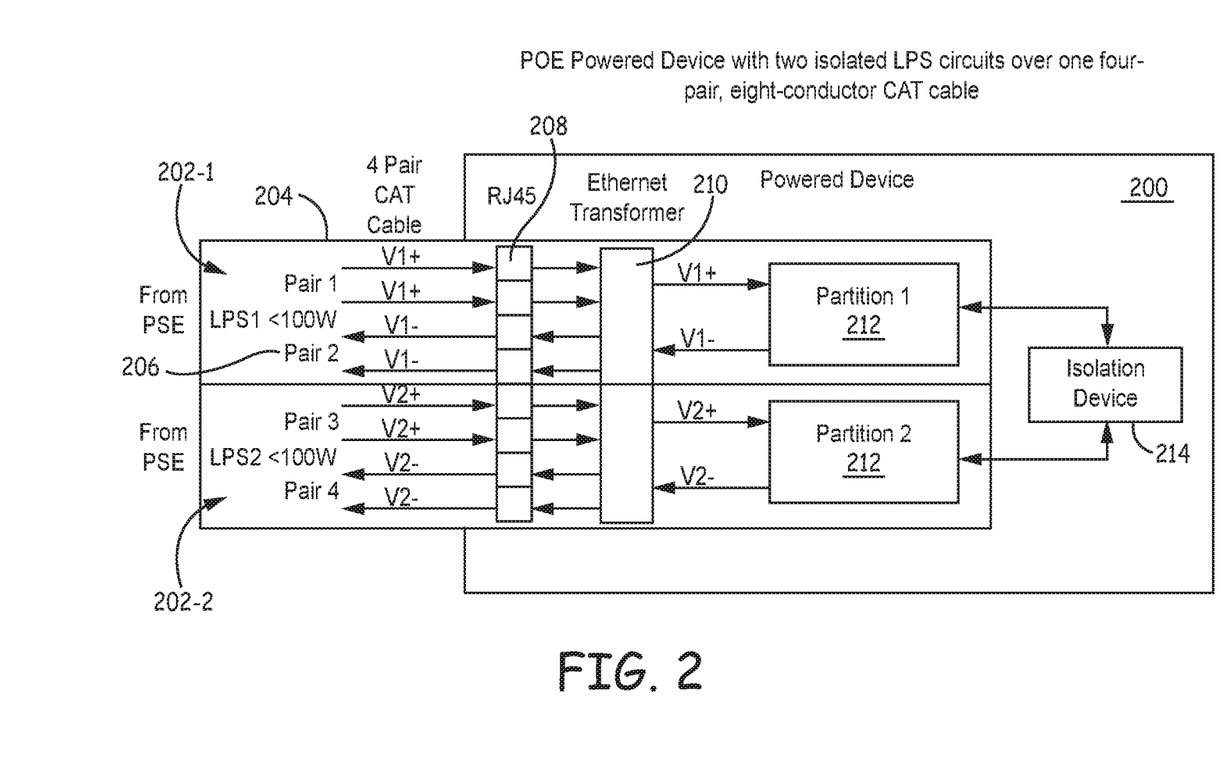
FIG. 2 shows a power-over-Ethernet (POE) powered device having two isolated limited power source (LPS) circuits over one four-pair Category 5 or higher (CAT) cable.

FIG. 2 shows a power-over-Ethernet (POE) powered device 200 having two isolated cable circuits 202 (individually referenced as 202-1 and 202-2) over one four-pair CAT cable 204. In this example, each cable circuit 202 is implemented as a LPS circuit 202. The powered device 200 can, for example, be a node in a DAS (for example a remote unit 108 or an intermediary unit in a digital, analog, or hybrid digital/analog DAS). The powered device 200 can be a node in a similar type of system such as a cloud or centralized radio access network (C-RAN) (for example, a remote radio point in a C-RAN), a base station or eNodeB in a radio access network (for example, a small cell or femto-cell), and/or a wireless local area network access point (WLAN AP) (for example, a WLAN AP deployed in a conventional data network and/or a WLAN AP used in or with a radio access network, such as a WLAN AP deployed in an LTE in Unlicensed Spectrum (LTE-U) deployment, in an LTE License Assisted Access (LAA) deployment, and/or in an LTE-WLAN Radio Level Aggregation (LWA) deployment). The powered device 200 can be used in other ways.

The first LPS circuit 202-1 is defined by V1+/V1− in Pair 1 206 and Pair 2 206 of the four-pair CAT cable 204. The second LPS circuit 202-2 is defined by V2+/V2− in Pair 3 206 and Pair 4 206 of the four-pair CAT cable 204. Isolation between the two LPS circuits 202 may be maintained by a modular connector 208 (e.g., a RJ45 modular connector). An Ethernet transformer 210 includes isolation sufficient to keep the LPS circuits 202 electrically isolated. Each LPS circuit 202 may provide less than 100 W to the powered device 200, and the circuits in the powered device 200 (also referred to here as "device circuits") are partitioned such that each partition 212 consumes less power that what the corresponding LPS circuit 202 may provide. The partitions 212 may be kept electrically isolated from each other. But, signals may be communicated from one partition 212 to the other through one or more isolation devices 214. The insolation devices 214 may be one or a combination of transformers, opto-isolators, or other devices capable of providing sufficient isolation to maintain the isolation of the LPS circuits 202.

Figure 3:
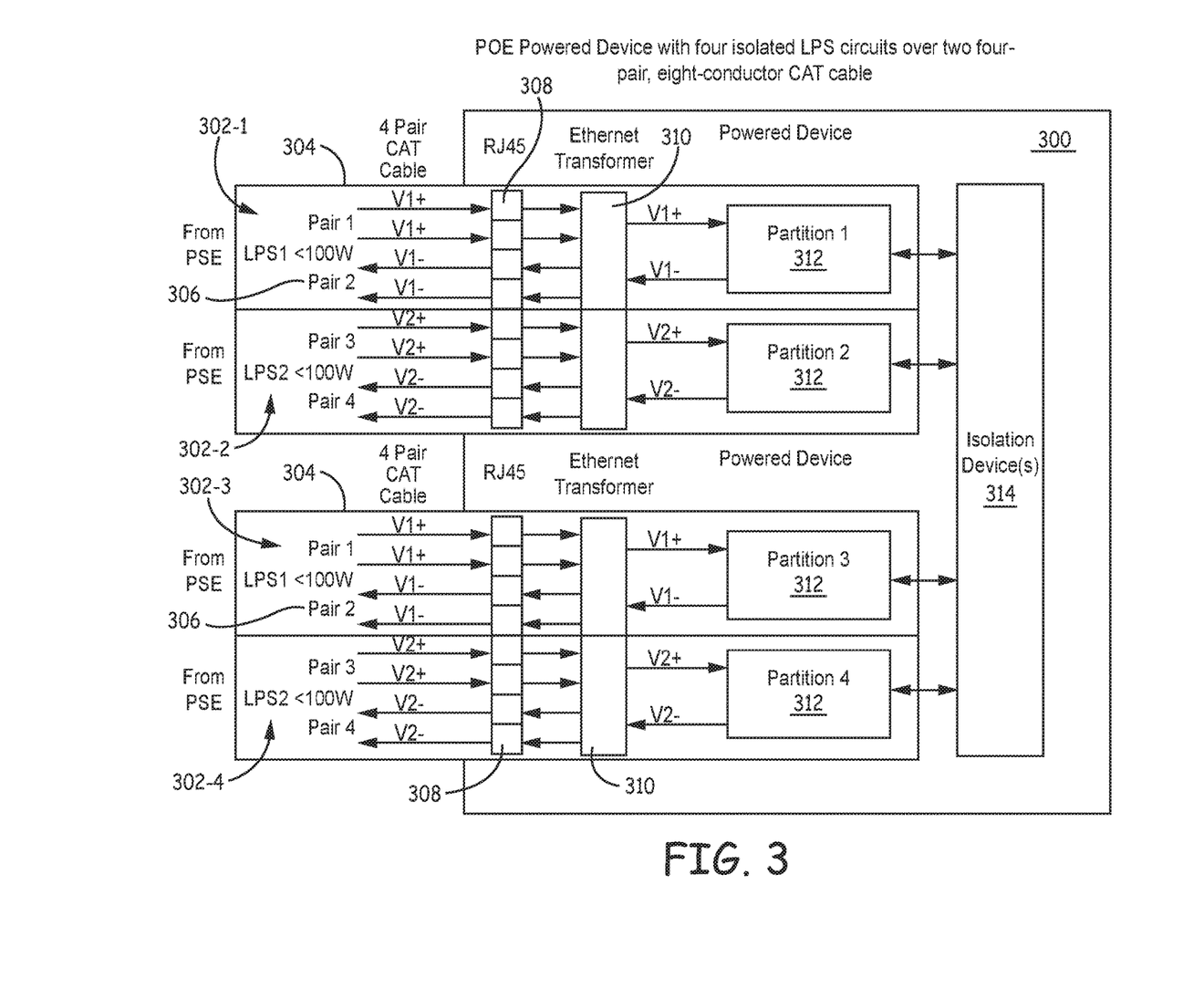
FIG. 3 shows a powered device having four LPS circuits on two CAT cables.

In some aspects, the same isolation techniques may be applied in cables having more conductors or with multiple CAT cables powering to a single powered device that has been properly partitioned. FIG. 3 shows a powered device 300 having four cable circuits 302 on two CAT cables 304. In this example, each of the cable circuits 302 is implemented as an LPS circuit 302. The powered device 300 can, for example, be a node in a DAS (for example a remote unit 108 or an intermediary unit in a digital, analog, or hybrid digital/analog DAS). The powered device 300 can be a node in a similar type of system such as a cloud or centralized radio access network (C-RAN) (for example, a remote radio point in a C-RAN), a base station or eNodeB in a radio access network (for example, a small cell or femto-cell), and/or a wireless local area network access point (WLAN AP) (for example, a WLAN AP deployed in a conventional data network and/or a WLAN AP used in or with a radio access network, such as a WLAN AP deployed in an LTE in Unlicensed Spectrum (LTE-U) deployment, in an LTE License Assisted Access (LAA) deployment, and/or in an LTE-WLAN Radio Level Aggregation (LWA) deployment). The powered device 300 can be used in other ways.

The upper 4-pair CAT cable 304 includes the first LPS circuit 302-1 defined by V1+/V1− in Pair 1 306 and Pair 2 306 and the second LPS circuit defined by V2+/V2− in Pair 3 306 and Pair 4 306. The lower 4-pair CAT cable 304 includes the third LPS circuit 302-3 defined by V1+/V1− in Pair 1 306 and Pair 2 306 and the fourth LPS circuit 302-4 defined by V2+/V2− in Pair 3 306 and Pair 4 306. Isolation between the two LPS circuits 302-1 and 302-2 in the upper 4-pair CAT cable 304 may be maintained by an RJ45 modular connector 308 and isolation between the two LPS circuits 302-3 and 302-4 in the lower 4-pair CAT cable 304 may be maintained by a second RJ45 modulator connector 308. The LPS circuits 302 are isolated by Ethernet transformers 310 for each of the respective CAT cables 304.

In the example shown in FIG. 3, the active electronics of the powered device 300 (also referred to here as the "device circuits") are partitioned into four partitions 312. Similar to what is shown in FIG. 2, signals may be communicated from one partition 312 to another partition 312 through one or more isolation devices 314 (e.g., transformers, opto-isolators). This configuration may be more cost effective than running a single power connection to an AC main power source.

Figure 4:
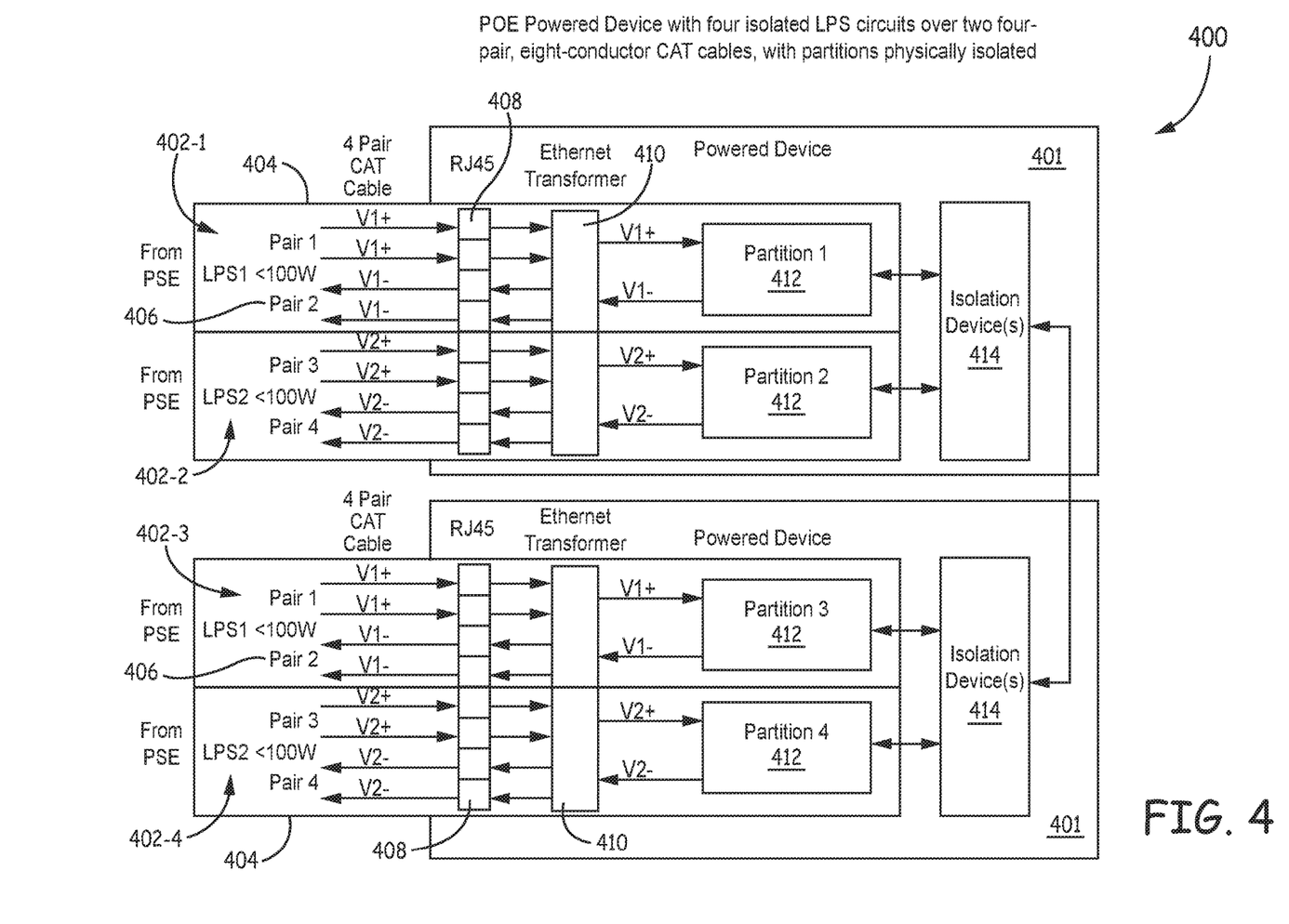
FIG. 4 shows example in which a single logical powered device is partitioned into multiple, physically distinct powered devices that are connected by an electrically isolated media.

For safety reasons, the circuits may be physically isolated in addition to electrically isolating them to prevent fire. This may be accomplished by partitioning a single logical powered device 400 (also referred to here as a "powered device assembly") into multiple, physically distinct powered devices 401 that are connected by an electrically isolated media as shown in FIG. 4. The powered device assembly 400 can, for example, be a node in a DAS (for example a remote unit 108 or an intermediary device such as an expansion unit in a digital, analog, or hybrid digital/analog DAS). The powered device 400 can be a node in a similar type of system such as a cloud or centralized radio access network (C-RAN) (for example, a remote radio point in a C-RAN), a base station or eNodeB in a radio access network (for example, a small cell or femto-cell), and/or a wireless local area network access point (WLAN AP) (for example, a WLAN AP deployed in a conventional data network and/or a WLAN AP used in or with a radio access network, such as a WLAN AP deployed in an LTE in Unlicensed Spectrum (LTE-U) deployment, in an LTE License Assisted Access (LAA) deployment, and/or in an LTE-WLAN Radio Level Aggregation (LWA) deployment). The powered device assembly 400 can be used in other ways.

The elements of the example in FIG. 4 that are similar to corresponding elements of the exemplary embodiment shown in FIGS. 2 and 3 are referenced in FIG. 4 using the same reference numerals used in FIGS. 2 and 3 but with the leading numeral changed from a "2" or "3" to a "4". Except as described below, the description of the elements set forth above in connection with the examples shown in FIGS. 2 and 3 applies to the corresponding elements of the example shown in FIG. 4 but generally will not be repeated in connection with FIG. 4 for the sake of brevity.

In the example shown in FIG. 4, signals may be communicated from one partition 412 to another partition 412 within the same physical powered device 401 through one or more isolation devices 414 (e.g., transformers, opto-isolators). Also, in this example, signals may be communicated from a partition 412 in one physical powered device 401 to a partition 412 within the other physical powered device 401 through one or more isolation devices 414 (e.g., transformers, opto-isolators).

Figure 5:
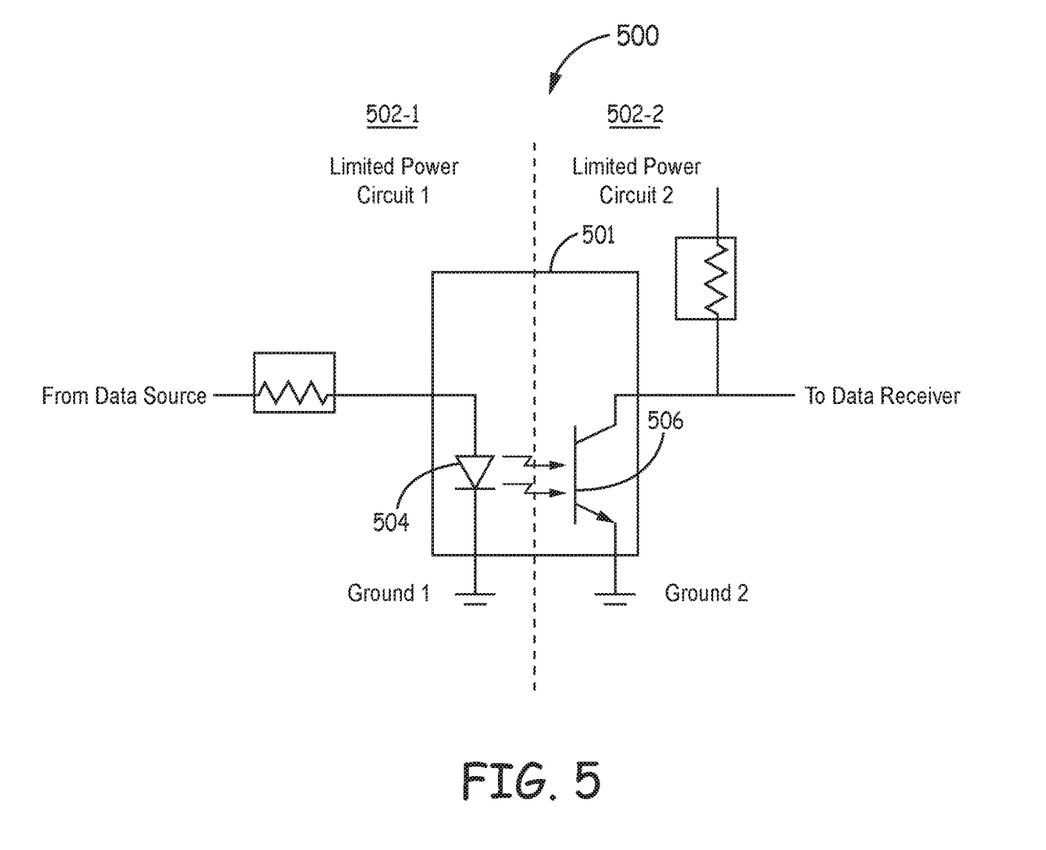
FIG. 5 shows an opto-isolator as one example of an isolation device for powered device such as those shown in FIGS. 2 through 4.

FIG. 5 shows an opto-isolator 501 as one example of an isolation device 500 for powered device such as those shown in FIGS. 2 through 4.

The opto-isolator 501 includes a photo-diode 504 and a photo-transistor 506. The opto-isolator 501 may provide isolation between two LPS circuits 502, Limited Power Circuit 1 502-1 and Limited Power Circuit 2 502-2. The opto-isolator 501 may also provide a means for communicating across an isolated boundary (represented by the dotted lines) between the two LPS circuits 502. The opto-isolator 501 may receive signals from a data source connected to Limited Power Circuit 1 502-1. The signals may be used to turn the photo-diode 504 of the opto-isolator 501 on and off. Light emitted by the photo-diode 504 may be detected by the photo-transistor 506 to allow data to be detected by Limited Power Circuit 2 502-2 on the opposite side of the isolation boundary. The photo-diode 504 and the photo-transistor 506 may be physically isolated from each other to provide upwards of thousands of volts of isolation.

Figure 6:
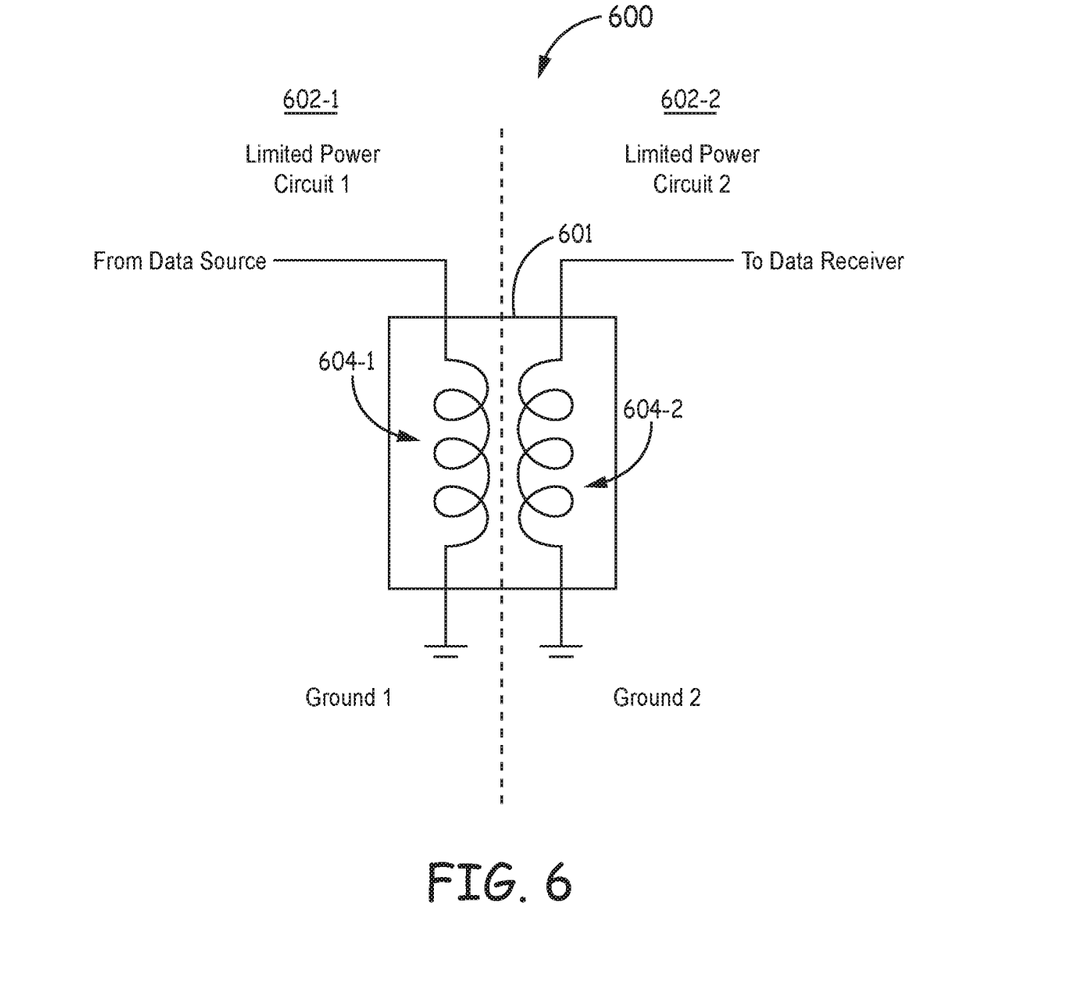
FIG. 6 shows a transformer as another example of an isolation device for powered devices such as those shown in FIGS. 2 through 4.

FIG. 6 shows a transformer 601 as another example of an isolation device 600 for powered devices such as those shown in FIGS. 2 through 4.

Similar to the opto-isolator described in FIG. 5, the transformer 601 may provide isolation and a means for communicating between two LPS circuits 602, Limited Power Circuit 1 602-1 and Limited Power Circuit 2 602-2. The isolation boundary (represented by the dotted line) separates the windings 604 of the transformer 601. Signals from a data source connected to Limited Power Circuit 1 602-1 may produce currents in the first transformer winding 604-1. The currents produce magnetic fields that induce currents in the second transformer winding 604-2 which allows data to be received by the data receiver connected to Limited Power Circuit 2 602-2. The transformer windings 604 may be isolated by insulation material that may provide upwards of thousands of volts of isolation.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A powered device configured to receive power from a multi-conductor cable and communicate information over the multi-conductor cable, the powered device comprising:
a connector to connect the multi-conductor cable to the powered device; and
a plurality of device circuits partitioned into a first partition and a second partition, wherein the first partition includes first device circuits of the plurality of device circuits and the second partition includes second device circuits of the plurality of device circuits;
wherein the powered device is configured to receive power from a first cable circuit and a second cable circuit provided over the multi-conductor cable, the powered device configured to separately power the first device circuits of the plurality of device circuits in the first partition using power received from the first cable circuit and power the second device circuits of the plurality of device circuits in the second partition using power received from the second cable circuit and to power isolate the first cable circuit from the second cable circuit to prevent the power received from the first cable circuit and the power received from the second cable circuit from being combined in the powered device, wherein the first device circuits of the plurality of device circuits in the first partition are electrically isolated from the second device circuits of the plurality of device circuits in the second partition;
wherein the first device circuits of the first partition are partitioned from other devices circuits of the plurality of device circuits such that the first device circuits of the first partition are configured to consume less power than the maximum amount of power that the first cable circuit is capable of providing, wherein the second device circuits of the second partition are partitioned from other devices circuits of the plurality of device circuits such that the second device circuits of the second partition are configured to consume less power than the maximum amount of power that the second cable circuit is capable of providing; and
wherein the powered device further comprises at least one isolation device coupled to the first partition and the second partition and configured to enable information to be communicated between the first partition and the second partition.

2. The powered device of claim 1, wherein the first cable circuit comprises a first limited power service (LPS) circuit and the second cable circuit comprises a second LPS circuit.

3. The powered device of claim 1, further comprising a transformer configured to electrically isolate the first cable circuit from the second cable circuit; and
wherein the connector is configured to physically isolate the first cable circuit from the second cable circuit.

4. The powered device of claim 1, wherein the at least one isolation device comprises an opto-isolator coupled to the first partition and the second partition and including a photo-diode and a photo-transistor configured to enable the information to be communicated between the first partition and the second partition.

5. The powered device of claim 4, wherein the photo-diode and the photo-transistor are physically separated such that the photo-diode and the photo-transistor provide over 1000 volts of isolation between the first partition and the second partition.

6. The powered device of claim 1, wherein the at least one isolation device comprises a transformer coupled to the first partition and the second partition and including transformer windings configured to enable the information to be communicated between the first partition and the second partition.

7. The powered device of claim 1, wherein the multi-conductor cable comprises a category (CAT) cable.

8. The powered device of claim 1, wherein the powered device comprises at least one of:
a node of a distributed antenna system;
a node in a cloud or centralized radio access network (C-RAN);
a base station or eNodeB in a radio access network; or
a wireless local area network access point (WLAN AP).

9. The powered device of claim 1, wherein the powered device is configured to communicate information over the multi-conductor cable according to an Ethernet protocol.

10. A method of providing power and communicating information to a powered device over a multi-conductor cable, wherein the powered device comprises a plurality of device circuits partitioned into a first partition and a second partition, the method comprising:
receiving power from a first cable circuit provided over the multi-conductor cable to separately power first device circuits of the plurality of device circuits in the first partition, wherein the first device circuits of the first partition are partitioned from other devices circuits of the plurality of device circuits such that the first device circuits of the first partition are configured to consume less power than the maximum amount of power that the first cable circuit is capable of providing;
receiving power from a second cable circuit provided over the multi-conductor cable to separately power second device circuits of the plurality of device circuits in the second partition, wherein the second device circuits of the second partition are partitioned from other devices circuits of the plurality of device circuits such that the second device circuits of the second partition are configured to consume less power than the maximum amount of power that the second cable circuit is capable of providing;

power isolating the first cable circuit from the second cable circuit to prevent the power received from the first cable circuit and the power received from the second cable circuit from being combined in the powered device, wherein the first device circuits of the plurality of device circuits in the first partition are electrically isolated from the second device circuits of the plurality of device circuits in the second partition; and communicating information between the first partition and the second partition using at least one isolation device in the powered device that is coupled to the first partition and the second partition.

11. The method of claim 10, wherein communicating information to a powered device over a multi-conductor is performed according to an Ethernet protocol.

12. A powered device configured to receive power from first and second multi-conductor cables and communicate information over at least one of the first and second multi-conductor cables, the powered device comprising:
first and second connectors to connect the first and second multi-conductor cables to the powered device; and
a plurality of device circuits partitioned into a first partition, a second partition, a third partition, and a fourth partition, wherein the first partition includes first device circuits of the plurality of device circuits and the second partition includes second device circuits of the plurality of device circuits;
wherein the powered device is configured to receive power from a first cable circuit and a second cable circuit provided over the first multi-conductor cable, the powered device configured to separately power the first device circuits of the plurality of device circuits in the first partition using power received from the first cable circuit and power the second device circuits of the plurality of device circuits in the second partition using power received from the second cable circuit and to power isolate the first cable circuit from the second cable circuit to prevent the power received from the first cable circuit and the power received from the second cable circuit from being combined in the powered device, wherein the first device circuits of the plurality of device circuits in the first partition are electrically isolated from the second device circuits of the plurality of device circuits in the second partition;
wherein the first device circuits of the first partition are partitioned from other devices circuits of the plurality of device circuits such that the first device circuits of the first partition are configured to consume less power than the maximum amount of power that the first cable circuit is capable of providing, wherein the second device circuits of the second partition are partitioned from other devices circuits of the plurality of device circuits such that the second device circuits of the second partition are configured to consume less power than the maximum amount of power that the second cable circuit is capable of providing;
wherein the powered device is configured to receive power from a third cable circuit and a fourth cable circuit provided over the second multi-conductor cable, the powered device configured to separately power the third partition using power received from the third cable circuit and power the fourth partition using power received from the fourth cable circuit and to power isolate the third cable circuit from the fourth cable circuit; and wherein the powered device further comprises at least one isolation device coupled to at least two of the first partition, the second partition, the third partition, and fourth partition and configured to enable information to be communicated between at least two of the first partition, the second partition, the third partition, and fourth partition.

13. The powered device of claim 12, wherein the first cable circuit comprises a first limited power service (LPS) circuit, the second cable circuit comprises a second LPS circuit, the third cable circuit comprises a third LPS circuit, and the fourth cable circuit comprises a fourth LPS circuit.

14. The powered device of claim 12, further comprising:
a first transformer configured to electrically isolate the first cable circuit from the second cable circuit; and
a second transformer configured to electrically isolate the third cable circuit from the fourth cable circuit; and
wherein the first connector is configured to physically isolate the first cable circuit from the second cable circuit; and
wherein the second connector is configured to physically isolate the third cable circuit from the fourth cable circuit.

15. The powered device of claim 12, wherein the at least one isolation device comprises an opto-isolator coupled to at least two of the first partition, the second partition, the third partition, and fourth partition and including a photo-diode and a photo-transistor configured to enable information to be communicated between at least two of the first partition, the second partition, the third partition, and fourth partition.

16. The powered device of claim 15, wherein the photo-diode and the photo-transistor are physically separated such that the photo-diode and the photo-transistor provide over 1000 volts of isolation between at least two of the first partition, the second partition, the third partition, and fourth partition.

17. The powered device of claim 12, wherein the at least one isolation device comprises a transformer coupled to at least two of the first partition, the second partition, the third partition, and fourth partition and including transformer windings configured to enable information to be communicated between at least two of the first partition, the second partition, the third partition, and fourth partition.

18. The powered device of claim 12, wherein the first and second multi-conductor cables comprise first and second category (CAT) cables.

19. The powered device of claim 12, wherein the powered device comprises at least one of:
a node of a distributed antenna system;
a node in a cloud or centralized radio access network (C-RAN);
a base station or eNodeB in a radio access network; or
a wireless local area network access point (WLAN AP).

20. The powered device of claim 12, wherein communicating information over at least one of the first and second multi-conductor cables is performed according to an Ethernet protocol.

21. A method of providing power to a powered device over first and second multi-conductor cables, wherein the powered device is configured to communicate information over at least one of the first and second multi-conductor cables, wherein the powered device comprises a plurality of device circuits partitioned into a first partition, a second partition, a third partition, and a fourth partition, the method comprising:
receiving power from a first cable circuit provided over the first multi-conductor cable to separately power first device circuits of the plurality of device circuits in the first partition, wherein the first device circuits of the first partition are partitioned from other devices circuits of the plurality of device circuits such that the first device circuits of the first partition are configured to consume less power than the maximum amount of power that the first cable circuit is capable of providing;

receiving power from a second cable circuit provided over the first multi-conductor cable to separately power second device circuits of the plurality of device circuits in the second partition, second partition, wherein the second partition includes second device circuits of the plurality of device circuits, wherein the second device circuits of the second partition are partitioned from other devices circuits of the plurality of device circuits such that the second device circuits of the second partition are configured to consume less power than the maximum amount of power that the second cable circuit is capable of providing;

receiving power from a third cable circuit provided over the second multi-conductor cable to separately power the third partition;

receiving power from a fourth cable circuit provided over the second multi-conductor cable to separately power the fourth partition;

power isolating the first cable circuit from the second cable circuit to prevent the power received from the first cable circuit and the power received from the second cable circuit from being combined in the powered device, wherein the first device circuits of the plurality of device circuits in the first partition are electrically isolated from the second device circuits of the plurality of device circuits in the second partition;

power isolating the third cable circuit from the fourth cable circuit; and communicating information between at least two of the first partition, the second partition, the third partition, and fourth partition using at least one isolation device coupled to at least two of the first partition, the second partition, the third partition, and fourth partition.

22. The method of claim 21, wherein the powered device is configured to communicate information over at least one of the first and second multi-conductor cables according to an Ethernet protocol.

23. A powered device assembly comprising:
a first powered device configured to receive power from a first multi-conductor cable; and
a second powered device configured to receive power from a second multi-conductor cable, wherein at least one of the first powered device and the second powered device is configured to communicate information over at least one of the first and second multi-conductor cables;
wherein the first powered device comprises:
 a first connector to connect the first multi-conductor cable to the first powered device; and
 a first plurality of device circuits partitioned into a first partition and a second partition, wherein the first partition includes first device circuits of the first plurality of device circuits and the second partition includes second device circuits of the first plurality of device circuits;
wherein the first powered device is configured to receive power from a first cable circuit and a second cable circuit provided over the first multi-conductor cable, the first powered device configured to separately power the first device circuits of the first plurality of device circuits in the first partition using power received from the first cable circuit and power the second device circuits of the first plurality of device circuits in the second partition using power received from the second cable circuit and to power isolate the first cable circuit from the second cable circuit to prevent the power received from the first cable circuit and the power received from the second cable circuit from being combined in the powered device, wherein the first device circuits of the first plurality of device circuits in the first partition are electrically isolated from the second device circuits of the first plurality of device circuits in the second partition;

wherein the first device circuits of the first partition are partitioned from other devices circuits of the first plurality of device circuits such that the first device circuits of the first partition are configured to consume less power than the maximum amount of power that the first cable circuit is capable of providing, wherein the second device circuits of the second partition are partitioned from other devices circuits of the first plurality of device circuits such that the second device circuits of the second partition are configured to consume less power than the maximum amount of power that the second cable circuit is capable of providing;

wherein the second powered device comprises:
 a second connector to connect the second multi-conductor cable to the second powered device; and
 a second plurality of device circuits partitioned into a third partition and a fourth partition;
wherein the second powered device is configured to receive power from a third cable circuit and a fourth cable circuit provided over the second multi-conductor cable, the second powered device configured to separately power the third partition using power received from the third cable circuit and power the fourth partition using power received from the fourth cable circuit and to power isolate the third cable circuit from the fourth cable circuit;

wherein the powered device assembly further comprises at least one isolation device coupled to the first partition and the third partition and configured to enable information to be communicated between at least two of the first partition and the third partition.

24. The powered device assembly of claim 23, wherein the first cable circuit comprises a first limited power service (LPS) circuit, the second cable circuit comprises a second LPS circuit, the third cable circuit comprises a third LPS circuit, and the fourth cable circuit comprises a fourth LPS circuit.

25. The powered device assembly of claim 23, wherein the first powered device further comprises:
a first transformer configured to electrically isolate the first cable circuit from the second cable circuit; and
wherein the first connector is configured to physically isolate the first cable circuit from the second cable circuit; and
wherein the second powered device further comprises:
a second transformer configured to electrically isolate the third cable circuit from the fourth cable circuit; and
wherein the second connector is configured to physically isolate the third cable circuit from the fourth cable circuit.

26. The powered device assembly of claim 23, wherein the at least one isolation device comprises an opto-isolator coupled to the first partition and the third partition and including a photo-diode and a photo-transistor configured to enable information to be communicated between the first partition and the third partition.

27. The powered device assembly of claim 26, wherein the photo-diode and the photo-transistor are physically separated such that the photo-diode and the photo-transistor provide over 1000 volts of isolation between at least two of the first partition, the second partition, the third partition, and fourth partition.

28. The powered device assembly of claim 23, wherein the at least one isolation device comprises a transformer coupled to at least two of the first partition and the third partition and including transformer windings configured to enable information to be communicated between the first partition and the third partition.

29. The powered device assembly of claim 23, wherein the first and second multi-conductor cables comprise first and second category (CAT) cables.

30. The powered device assembly of claim 23, wherein the powered device assembly comprises at least one of:
 a node of a distributed antenna system;
 a node in a cloud or centralized radio access network (C-RAN);
 a base station or eNodeB in a radio access network; or
 a wireless local area network access point (WLAN AP).

31. The powered device assembly of claim 23, wherein at least one of the first powered device and the second powered device is configured to communicate information over at least one of the first and second multi-conductor cables according to an Ethernet protocol.

32. A method of providing power to a powered device assembly over first and second multi-conductor cables, wherein the powered device assembly comprises first and second powered devices, wherein at least one of the first powered device and the second powered device is configured to communicate information over at least one of the first and second multi-conductor cables, wherein the first powered device comprises a first plurality of device circuits partitioned into a first partition and a second partition, wherein the second powered device comprising a second plurality of device circuits partitioned into a third partition and a fourth partition, the method comprising:

receiving power from a first cable circuit provided over the first multi-conductor cable to separately power first device circuits of the first plurality of device circuits in the first partition, wherein the first device circuits of the first partition are partitioned from other devices circuits of the first plurality of device circuits such that the first device circuits of the first partition are configured to consume less power than the maximum amount of power that the first cable circuit is capable of providing;

receiving power from a second cable circuit provided over the first multi-conductor cable to separately power second device circuits of the first plurality of device circuits in the second partition, wherein the second device circuits of the second partition are partitioned from other devices circuits of the first plurality of device circuits such that the second device circuits of the second partition are configured to consume less power than the maximum amount of power that the second cable circuit is capable of providing;

receiving power from a third cable circuit provided over the second multi-conductor cable to separately power the third partition;

receiving power from a fourth cable circuit provided over the second multi-conductor cable to separately power the fourth partition;

power isolating the first cable circuit from the second cable circuit to prevent the power received from the first cable circuit and the power received from the second cable circuit from being combined in the powered device;

power isolating the third cable circuit from the fourth cable circuit; and communicating information between the first partition and the third partition using at least one isolation device coupled to the first partition and the third partition.

33. The method of claim 32, wherein at least one of the first powered device and the second powered device is configured to communicate information over at least one of the first and second multi-conductor cables according to an Ethernet protocol.

* * * * *

UNITED STATES PATENT AND TRADEMARK OFFICE
CERTIFICATE OF CORRECTION

PATENT NO. : 11,582,047 B2
APPLICATION NO. : 15/569370
DATED : February 14, 2023
INVENTOR(S) : Hanson Page 1 of 1

It is certified that error appears in the above-identified patent and that said Letters Patent is hereby corrected as shown below:

In the Claims

At Column 14, Line 43, Claim 23: Please delete "at least two of" between "communicated between" and "the".

At Column 15, Line 11, Claim 28: Please delete "at least two of" between "coupled to" and "the first partition".

Signed and Sealed this
Twenty-fifth Day of July, 2023

Katherine Kelly Vidal
*Director of the United States Patent and Trademark Office*